United States Patent
Ma et al.

(10) Patent No.: US 9,754,255 B1
(45) Date of Patent: Sep. 5, 2017

(54) GEO-LOCATION BASED AUTHENTICATION IN A MOBILE POINT-OF-SALE TERMINAL

(71) Applicant: Maxim Integrated Products, Inc., San Jose, CA (US)

(72) Inventors: Edward Tangkwai Ma, Plano, TX (US); Michael L Bolan, Hillsboro, TX (US); Robert Robert Muchsel, Addison, TX (US); Donald W. Loomis, Coppell, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 189 days.

(21) Appl. No.: 13/861,953

(22) Filed: Apr. 12, 2013

Related U.S. Application Data

(60) Provisional application No. 61/624,101, filed on Apr. 13, 2012.

(51) Int. Cl.
  *G06Q 20/00* (2012.01)
  *G06Q 20/40* (2012.01)
  *H04W 4/02* (2009.01)
  *H04W 12/06* (2009.01)

(52) U.S. Cl.
  CPC .............. *G06Q 20/40* (2013.01); *H04W 4/02* (2013.01); *H04W 12/06* (2013.01)

(58) Field of Classification Search
  None
  See application file for complete search history.

(56) References Cited

U.S. PATENT DOCUMENTS

| | | | | |
|---|---|---|---|---|
| 8,727,892 | B1* | 5/2014 | Chun | G07F 17/3276 463/25 |
| 9,292,493 | B2* | 3/2016 | Chandramouli | G06F 17/274 |
| 2012/0010930 | A1* | 1/2012 | Langdon | G06Q 30/0207 705/14.16 |
| 2012/0078751 | A1* | 3/2012 | MacPhail | G06Q 20/06 705/26.41 |
| 2012/0190386 | A1* | 7/2012 | Anderson | G01C 15/04 455/456.3 |
| 2012/0329555 | A1* | 12/2012 | Jabara | G07F 17/3218 463/29 |

(Continued)

*Primary Examiner* — Gurkanwaljit Singh
(74) *Attorney, Agent, or Firm* — North Weber & Baugh LLP

(57) ABSTRACT

The invention relates to authentication in mobile financial transactions, and more particularly, to systems, devices and methods of employing a location tracking function within a mobile device for the purpose of authenticating a user and a trusted transaction when this mobile device is configured to a mobile point-of-sale (POS) terminal. Authentication is primarily implemented by a secure element integrated within the mobile device based on comparison between captured geo-location data and some known information, such as a retailer address, this user's behavior pattern and shopping habit, that may be derived from the geo-location data. In the secure element, a secure memory stores a plurality of geo-location data from which a secure processor generates information concerning a behavior pattern or a shopping habit of the user. A V/A unit receives a real-time geo-location of the mobile device, and thereby, verifies the user or the trusted transaction according to the generated information.

20 Claims, 6 Drawing Sheets

(56) References Cited

U.S. PATENT DOCUMENTS

| | | | |
|---|---|---|---|
| 2013/0073387 A1* | 3/2013 | Heath | G06Q 50/01 |
| | | | 705/14.53 |
| 2013/0085881 A1* | 4/2013 | Chary | G06Q 30/02 |
| | | | 705/26.1 |
| 2013/0138428 A1* | 5/2013 | Chandramouli | G06F 17/274 |
| | | | 704/9 |
| 2014/0162598 A1* | 6/2014 | Villa-Real | H04M 1/66 |
| | | | 455/411 |
| 2015/0058224 A1* | 2/2015 | Gaddam | G06Q 20/327 |
| | | | 705/44 |

* cited by examiner

300

600

GEO-LOCATION BASED AUTHENTICATION IN A MOBILE POINT-OF-SALE TERMINAL

CROSS REFERENCE TO RELATED APPLICATION

The application claims the benefit under 35 U.S.C. §119(e) of Provisional Application Ser. No. 61/624,101, entitled "Geo-Location Based Authentication in a Mobile Point-of-Sale Terminal," filed on Apr. 13, 2012, the subject matter of which is incorporated herein by reference.

BACKGROUND

A. Technical Field

The present invention relates generally to authentication in mobile banking, and more particularly, to systems, devices and methods of employing a location tracking function within a mobile device, such that a geographical location (geo-location) is tracked in real-time for the purpose of authenticating a user and a trusted transaction as this mobile device is configured to a mobile point-of-sale (POS) terminal in mobile banking applications.

B. Background of the Invention

Although they were initially introduced as communication terminals to receive and make phone calls, mobile devices have been applied in financial transaction during the past decade. The mobile devices allow each individual customer to own his or her own secure POS terminal, and offer unprecedented flexibility and mobility. Our traditional perspectives on the POS terminals have been revolutionized by this trend of applying mobile devices as secure POS terminals. Moreover, a term, "mobile banking," is developed concerning financial activities involving a mobile POS device, and examples of these activities include, but are not limited to, transfer of monetary value in bank accounts, prepaid cards, store credits, virtual points, or credit cards.

In mobile banking, the conventional mobile device is conveniently configured to a secure mobile POS terminal by a software application. The software application is installed on the mobile device upon a request by the user, and normally each bank or retailer may support its own application that has a unique interface. The mobile POS terminal optionally includes an accessory card reader to read account information from an internal memory, or external credit and debit cards owned by the user. However, the account information may also be directly input by the user through the keyboard or touch screen of the mobile device at an interface provided by the software application. A request of a trusted transaction is also entered via the same software interface into the mobile POS terminal. Therefore, the mobile POS terminal successfully receives secure information for the account and trusted transaction.

The mobile POS terminal conveniently adopts an authentication method, such as a personal identification number (PIN), a passphrase, or a challenge/response. Among these methods, a username, coupled with a password, i.e., PIN, has been the most commonly applied method for electronic transactions that are implemented over the Internet. The account information is securely stored within the software application that also provides an interface for implementing trusted transactions. The user logs in the application by providing a username and a password, getting access to the account information and authorizing trusted transactions. The username and the password are selected by the user for each individual bank or retailer, and may be remembered by the software application or inputted by the user every time he or she accesses the application. Upon receiving the username and password, a remote server is controlled by the bank or retailer to authenticate the user and any trusted transactions that he or she requests.

The username and password authentication cannot provide sufficient security to trusted transactions over the mobile POS terminals. Such an authentication method has long existed since the internet was invented, and tamper techniques has reasonably caught up with the progress of this authentication method. In particular, when strength of the password is limited, a criminal can easily decipher it within a short period of time. Efforts to tamper the account are further reduced when the username and password are remembered by the software applications, since anyone that tampers the mobile device can get access to the account. As a result, manual input of complex password with improved strength is desirable, but it is unavoidably difficult for the user to manage, particularly when he or she owns multiple accounts and each account has a distinct username and password.

Although the existing mobile banking has fundamentally changed the format of financial transaction, user authentication is a big concern, and to certain extent, may compromise the benefits of flexibility and mobility of mobile banking in the long term. Most credit card fraud is associated with replacement of the physical credit or debit cards, and such card-not-present fraud may be exacerbated as the mobile devices are directly used for payment. A need exists to develop a highly reliable authentication method for a mobile POS terminal that reduces user input and preferably takes advantage of unique characteristics of mobile banking.

SUMMARY OF THE INVENTION

Various embodiments of the present invention relates generally to authentication in mobile financial transactions, and more particularly, to systems, devices and methods of employing a location tracking function within a mobile device, such that a geographical location (geo-location) is tracked in real-time for the purpose of authenticating a user and a trusted transaction as this mobile device is configured to a mobile point-of-sale (POS) terminal in mobile financial applications.

In accordance with the invention, a secure element is used to authenticate a user or a trusted transaction made via a mobile device. The secure element comprises a secure memory, a secure processor and a verification/authentication (V/A) unit. The secure memory stores a plurality of geo-location data that are recorded by the mobile device, and the secure processor generates information concerning a behavior pattern or a shopping habit of the user based on the plurality of geo-location data. The V/A unit receives a real-time geo-location of the mobile device and verifies the user or the trusted transaction according to the information concerning the behavior pattern or the shopping habit.

In accordance with the invention, an authentication method is used to authenticate a user or a trusted transaction based on information concerning a behavior pattern or a shopping habit of a user. A plurality of geo-location data are collected by the mobile device based on its real-time location tracking function, and used to generate and update the information concerning the behavior pattern or the shopping habit. When a request is received from the user to make a trusted transaction, the trusted transaction is verified according to the information concerning the behavior pattern or the shopping habit and a real-time geo-location that is included in the plurality of geo-location data and associated with the trusted transaction.

In accordance with the invention, another authentication method is implemented based on a geo-location of a mobile device. The geo-location of the mobile device is determined based on its real-time location tracking function, when a user makes a request for a trusted transaction via the mobile device. A location of the retailer is also extracted, and compared to the geo-location of the mobile device. The trusted transaction is authenticated when these two locations are consistent.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relates generally to authentication in mobile banking, and more particularly, to systems, devices and methods of employing a location tracking function within a mobile device, such that a geographical location (geo-location) is tracked in real-time for the purpose of authenticating a user and a trusted transaction as this mobile device is configured to a mobile point-of-sale (POS) terminal in mobile banking applications. Authentication is primarily based on comparison between the captured real-time geo-location and some known information, such as a retailer address, this user's behavior pattern and shopping habits. Any inconsistency is potentially associated with a theft or tamper attempt, and further tamper protection may be enforced based on such detection. Most important of all, such a geo-location based authentication may be automatically implemented in the background, reducing user involvement while maintaining a high level of security for the trusted transactions.

Figure 1:
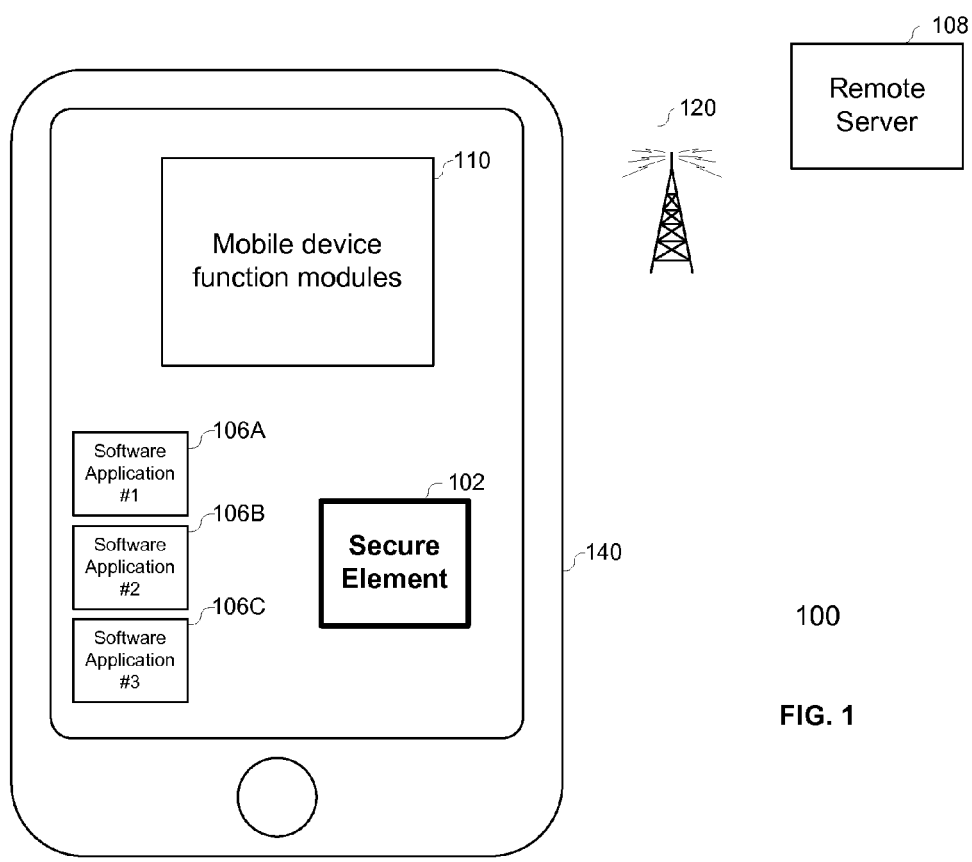
FIG. 1 illustrates a block diagram of a mobile POS terminal according to various embodiments in the invention.

FIG. 1 illustrates a block diagram 100 of a mobile POS terminal according to various embodiments in the invention. The mobile POS terminal 100 is configured from a conventional mobile device 140 which is primarily used for other purposes including communication and computation. Software applications 106A-106C are installed on the mobile device 140 to receive requests for various trusted transactions and to provide programs that control implementation of the trusted transactions. Function modules 110 in the mobile device 140 and/or a secure element 102 are controlled to process the requests and communicate with remote servers 108 to complete the trusted transactions. The remote servers 108 belong to financial or other special entities that are involved in the trusted transactions, and some exemplary entities are banks, retailers, credit card companies, mobile service providers and governments.

In order to securely process the trusted transactions, secure environments are created locally inside the mobile device 140 based on the secure element 102. Sensitive software applications are implemented separately within the secure element 102 for the trusted transactions. In one embodiment, the secure element 102 is partitioned from existing mobile device function modules 110, e.g., processor and memory in a cellular phone. In another embodiment, the secure element 102 is a standalone component incorporated into the mobile device 140. In certain embodiment, the embedded secure element 102 is integrated in a removable memory card or a smart card, such as a subscriber identity module (SIM) card or a universal integrated circuit card (UICC). In certain embodiment, the secure element 102 is integrated in other existing embedded components, such as a power management integrated circuit (PMIC) chip 104. Regardless of being standalone or sharing an estate with other components, this secure element 102 preferably owns a chip estate and secure data link that are relatively dedicated and separate from those used in the other components.

The secure element 102 is integrated within the mobile device 140 by the manufacturer prior to delivery to a user, and thus, they are always associated with the particular mobile POS terminal that it is sold with. Once the user activates the mobile device 140, the secure environments are reserved to process sensitive data and trusted transactions associated with this particular user. The sensitive data includes account numbers, monetary value, access codes, financial transactions/balances, right management, program algorithms, passport information, personal identity, and credit history.

The sensitive data are securely processed in the mobile device 140, and communicated between the user and the remote servers 108 via a communication network 120. In various embodiments of the invention, the communication network 120 may be a cellular network, a satellite network, a wireless broadband network, or a Wi-Fi based computer network.

Figure 2:
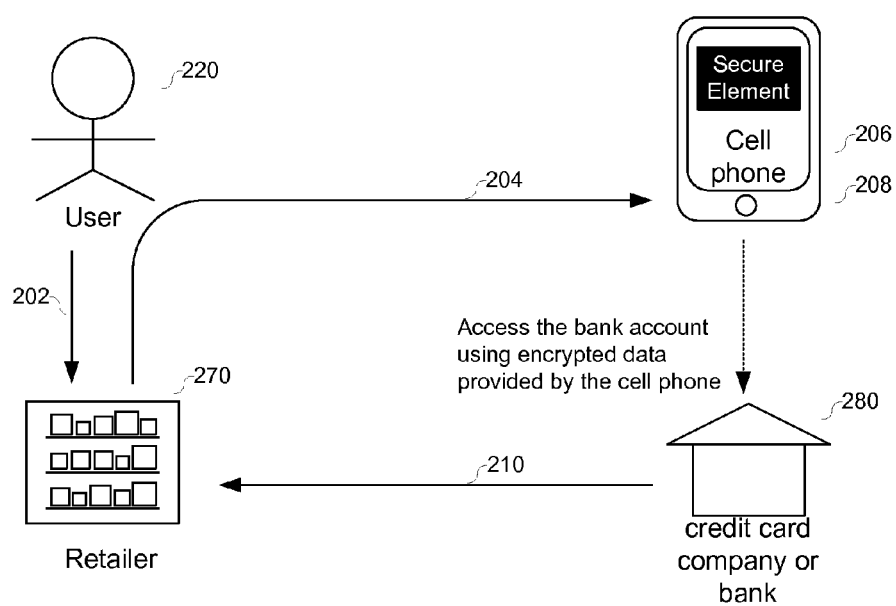
FIG. 2 illustrates an exemplary process of paying a purchase order using a mobile POS terminal according to various embodiments in the invention.

FIG. 2 illustrates an exemplary process 200 of paying a purchase order using the mobile POS terminal 100 according to various embodiments in the invention. This transaction involves a user 220, a retailer 270 and a credit card company 280. The mobile POS terminal 100 is used to authenticate the parties and transaction, store sensitive data and process the transaction. When the user 220 makes a request to pay via his bank account, the related bank is involved to replace the role of the credit card company 280.

The user 220 makes a purchase order with the retailer 270 (step 202). A request is entered in the mobile POS terminal 100 to pay the retailer 270 using a credit or debit card (step 204). The user 220 and the trusted transaction are authenticated (step 206). As most existing authentication methods are, authentication step 206 is normally implemented remotely within the remote server 108 that is owned by the credit card company 280. However, in various embodiments of the invention, the secure element 102 enhances the security level, such that authentication step 206 may also be implemented locally within the secure element 102. Upon authentication, the trusted transaction is processed within the mobile device 140 and the remote server 108 of the credit card company 280 (step 208). The credit card company 280 may communicate with the retailer 270 to make payment for the purchase order (step 210). In this purchase payment process 200, sensitive data are always exchanged among the involved parties in encrypted formats to ensure a high security level.

Prior to implementing the trusted transaction (steps 208-210), authentication step 206 is implemented under the control of the related software applications 106A-106C. The user has to be an authorized holder/user of the mobile POS terminal 100 and the bank/credit card account, and the trusted transaction has to be a legitimate transaction authorized by the user. The user normally selects a four-digit password used to access the mobile device 140 every time the device 140 is initialized. Once the mobile device 140 is configured to a mobile POS terminal 100, each of software applications 106A-106C requires another respective user-defined password to authorize the user for account access in addition to the four-digit password for device access. For suspicious transactions, the software applications 106A-106C may require authorization involving additional questions and user inputted confirmation.

Geo-location based authentication is implemented in step 206 to authenticate the user and the trusted transaction according to the geographical location of the mobile POS terminal 100. The geographical location is tracked by the communication network 120 and the mobile device 140, and further processed for the purpose of authentication within the secure element 102. In various embodiments of the invention, a user has to enable this geo-location based authentication at a user interface of a software application, and thereafter, programs within the application control the secure element 102 to complete the authentication process.

Geo-location based authentication is enabled by a standard function of real-time location tracking that most mobile devices have. In accordance with the communication network and the mobile device, this function of real-time location tracking is implemented based on pervasive location-specific signals that are normally used by the mobile devices for the purpose of communication. These location-specific signals include, but are not limited to, radio signals in the cellular network, electrical signals in a radio or television (TV) broadcast network, satellite signals in a global positioning system (GPS) and Wi-Fi signals in the computer network. Signal strength, direction and out-of-band data of these location-specific signals are monitored, and accordingly, the relative location of the mobile device is determined in reference to a known position of a base station in the cellular network, a transmitter in a radio or TV broadcasting network, a satellite in the GPS or a router in a wireless local area network (WLAN).

Figure 3:
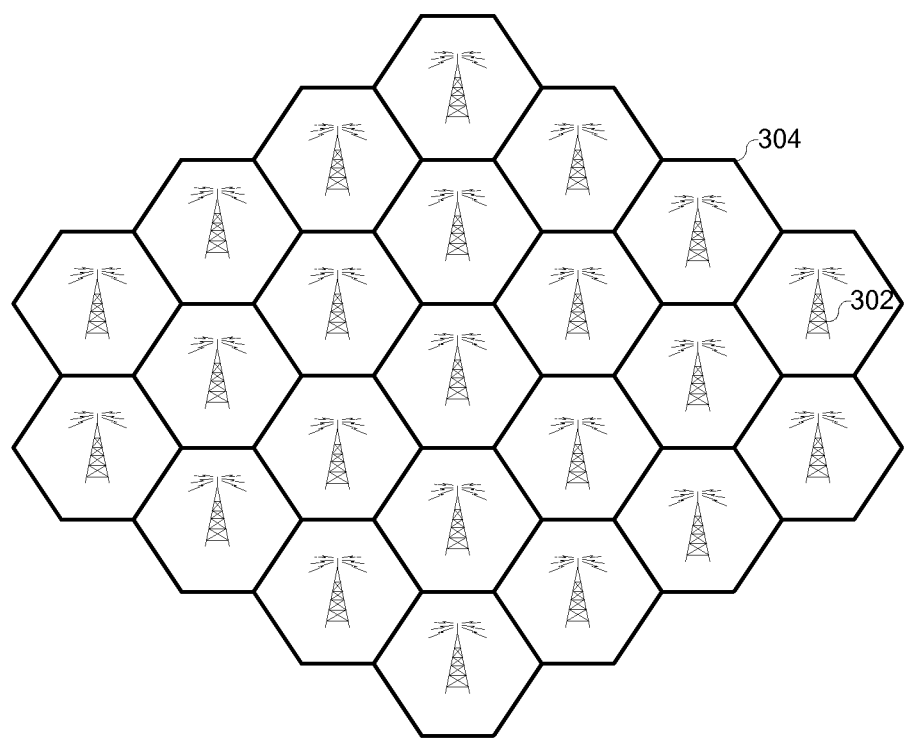
FIG. 3 illustrated an exemplary cellular network according to various embodiments in the invention.

FIG. 3 illustrated an exemplary cellular network 300 according to various embodiments in the invention. In this wireless network 300, towers and base stations 302 are arranged into a cellular network to transmit and receive radio signals. Internal low-power transceivers in individual phones allow them to communicate with the nearest towers. As a user carrying a mobile device travels among cells, the strength of the radio signals diminishes at the cell edges 304, and increases as the user approaches the towers 302. The base stations monitor the strength of the radio signal returned by the mobile device such that the location of the mobile device is tracked in relevance to the cellular network. This relevant location is converted to a geo-location on a map. The geo-location is further conveyed to the mobile POS terminal 100 and displayed on the screen. Likewise, the geo-location of the mobile POS terminal 100 may also be determined in the GPS and the WLAN.

Geo-location of the mobile POS terminal 100 may be constantly recorded, and in combination with other useful information, such geo-location data may be used to derive a behavior pattern and a shopping habit of the user. In one embodiment, time and geo-location data may be combined to understand the frequency and physical range of the user's daily activity, i.e., the behavior pattern. Similarly, each shopping activity is associated with time of shopping, credit card used, a price range, and a particular retailer or retailer branch at the geo-location. The shopping habit is extracted based on a history of the user's shopping activities, and therefore, is constantly updated as the user continues his or her daily shopping activities. As a longer history of geo-location is tracked and analyzed, a more accurate behavior pattern and shopping habit is established for use in user and transaction authentication of this particular user. As a result, the behavior pattern and the shopping habit are automatically embedded within the mobile POS terminal as a user identity that a criminal cannot easily fake or bypass.

Figure 4:
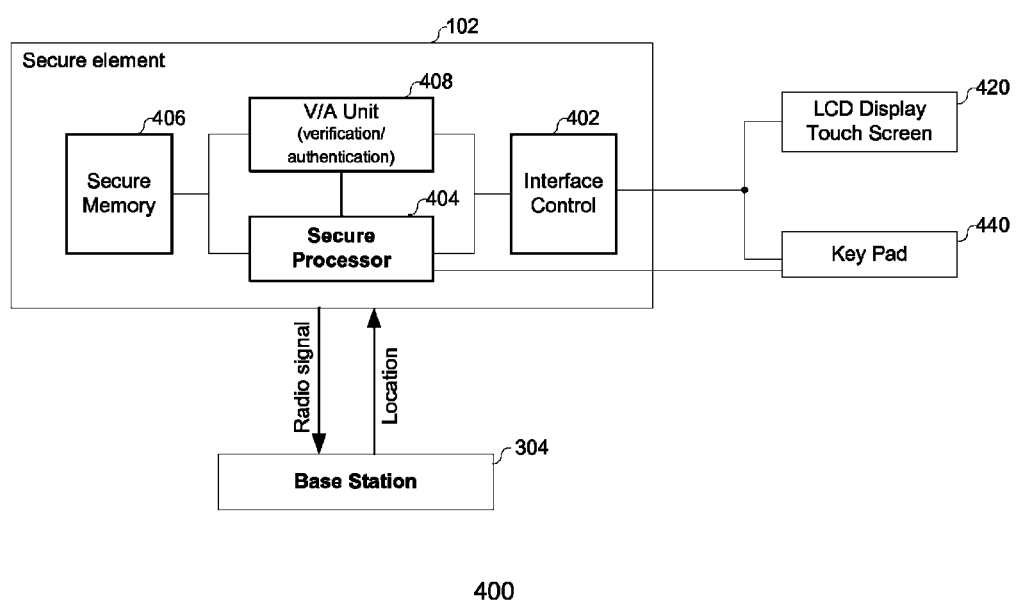
FIG. 4 illustrates an exemplary block diagram of a geo-location based authentication system applied in a mobile POS terminal according to various embodiments in the invention.

FIG. 4 illustrates an exemplary block diagram 400 of a geo-location based authentication system applied in a mobile POS terminal 100 according to various embodiments in the invention. A LCD display and a touch screen 420 and a key pad 440 constitute a user interface to allow the user to enable geo-location based authentication and select a security level. In this authentication system, the mobile POS terminal 100 communicates via a radio link to the base stations 302, and the base stations 302 identify and feedback its geo-location to the terminal 100.

The secure element 102 comprises an interface control 402, a secure processor 404, a secure memory 406 and a Verification/Authentication (V/A) unit 408. The interface control 222 is coupled to securely receive user input from the LCD display/touch screen 420 and the key pad 440. Geo-location data provided by the base stations 410 may be used for authentication directly, or stored in the secure memory 406. The secure processor 404 extracts a history of the geo-location data that is stored and constantly updated within the secure memory 406, and generates the behavior pattern and the shopping habit for the user. The behavior pattern and the shopping habit may also be stored in the secure memory 406, and updated constantly or only upon a user request. The V/A unit 408 is coupled to receive the real-time geo-location from the base stations 302 directly, and verifies the user and the transaction accordingly. In certain embodiments, the V/A unit 408 is integrated in the secure processor 404.

Verification of the user and transaction is not limited locally within the secure element 102. In certain embodiments, geo-location authentication may be implemented remotely within the remote servers 108 that are managed by the banks or credit card companies. Under these circumstances, the behavior pattern and shopping habits may still be generated by the secure processor 224 concerning each particular bank or credit card company, but is stored remotely within the corresponding remote servers 108. Authentication is implemented remotely within the remote servers 108 according to the geo-location data which is encrypted and securely transmitted to the remote servers 108.

Various embodiments of the geo-location based authentication system 400 may be realized in hardware, firmware, software or a combination thereof. For example, the functions to practice various aspects of the present invention may be performed by components that are implemented in a wide variety of ways including discrete logic components, one or more application specific integrated circuits (ASICs), and/or program-controlled processors.

In one embodiment, both the secure processor 404 executes software programs and instructions according to the software applications 106A-106C that are stored in the secure memory 406 or another memory within the mobile device 140. The software applications 106A-106C hold several predetermined authentication schemes for implementing geo-location based authentication for specific transactions. Upon receiving a request for the trusted transaction, the secure processor 404 and the V/A unit 408 enable and control a particular geo-location based authentication method according to the user inputted security level.

Figure 5:
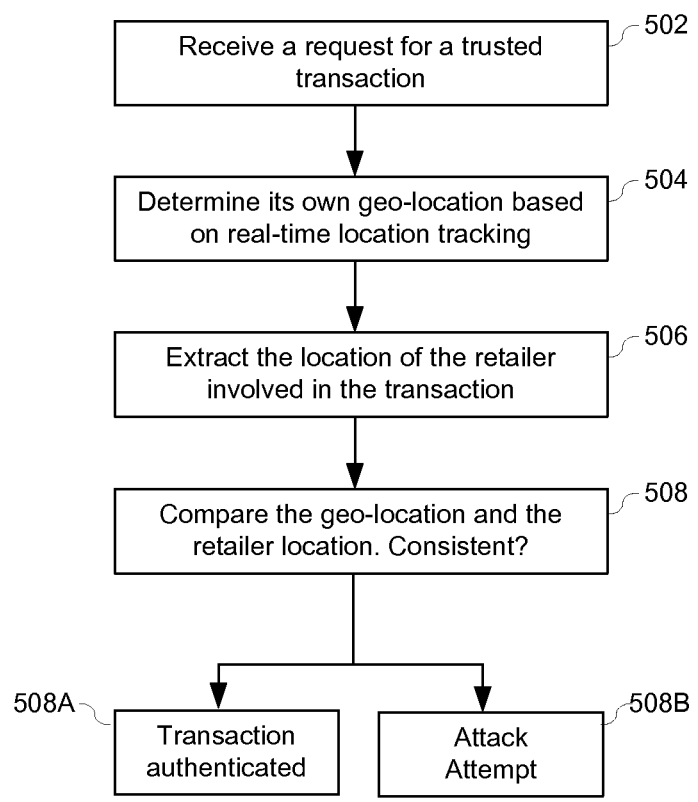
FIG. 5 illustrates a first exemplary method of authenticating a trusted transaction using a geo-location of a mobile POS terminal according to various embodiments in the invention.

Geo-location based authentication may be implemented in a variety of methods. FIG. 5 illustrates a first exemplary method 500 of authenticating a trusted transaction using a geo-location of a mobile POS terminal 100 according to various embodiments in the invention. The authentication method 500 is based on verification of the geo-location according to the transaction location. Upon receiving a payment request (step 502), the mobile POS terminal 100 determines its own geo-location using the real-time location tracking function (step 504). In various embodiments, the payment request normally incorporates location associated with the particular retailer site where this payment is made; otherwise, the location may be determined according to the specific retailer site using a real-time search using public or proprietary information. In particular, this real-time search may be implemented based on a pre-existing database, or a public information resource accessed via the Internet. As a result, the retailer location involved in the transaction is either extracted from the request or looked up from other resources (step 506). Thereafter, the geo-location is verified according to this retailer location (step 508). When consistency is confirmed between these two locations, the payment request is authenticated (step 508A). However, when inconsistency between these two locations is detected, a criminal may attempt to attack the programs in the mobile POS terminal 100 to conduct an unauthorized purchase transaction (step 508B), and further authentication may be needed.

Figure 6:
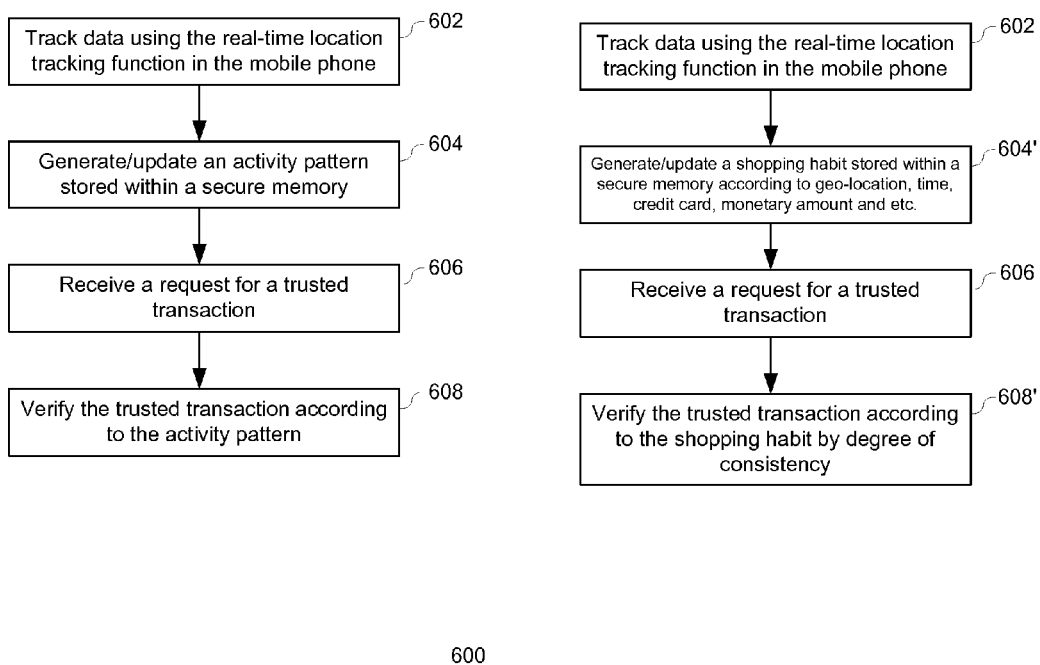
FIG. 6 illustrates a second exemplary method of authenticating a trusted transaction using a geo-location of a mobile POS terminal according to various embodiments in the invention.

FIG. 6 illustrates a second exemplary method 600 of authenticating a trusted transaction using a geo-location of a mobile POS terminal according to various embodiments in the invention. The authentication method 600 is based on a behavior pattern that is tracked and generated by the mobile POS terminal 100. In daily life of a user, the real-time location tracking function is constantly enabled and used to regularly record the user's geo-location in real-time (step 602). This location is analyzed locally by programs incorporated in the mobile terminal, such that the behavior pattern is generated and constantly updated based on these geo-location data (step 604). An upcoming request for a trusted transaction may be authenticated according to the behavior pattern (steps 606 and 608). When such inconsistency is confirmed, the payment request is terminated, or withheld for further authentication (step 608).

Particularly, the behavior pattern is associated with regular activities within a physical or geographical region for this user. The particular user may rarely act beyond this physical region. When a transaction request emerged out of this geographical region at a regular time or within this region but at an abnormal time, the trusted transaction is probably associated with a theft or tampering attempt, and preferably held for further authentication.

Likewise, the geo-location based authentication may also be associated with shopping habits of the user. To generate such a pattern, the mobile POS terminal 100 integrates the geo-location data with other useful information that are also tracked, including time, credit card, and monetary amount in each payment (step 604'). To constitute shopping habits, the geo-location is associated with many other data items including time of shopping, credit card used, a price range, and a particular retailer or retailer branch at the geo-location. When a trusted transaction is requested, each item concerning the shopping habit is verified according to the shopping habit. Any inconsistency may be associated with a potential unauthorized transaction or a tamper attempt. The exemplary inconsistencies include an abnormally high price paid in a certain store, a retailer branch that the user never visits, and an irregular transaction time for a certain store. The mobile POS terminal 100 may demand user input for confirmation or deny the transaction when any of these inconsistencies is detected.

Due to complexity of the shopping habit, a trusted transaction may also be evaluated using a degree of consistency that is exemplarily represented by a percentage value (step 608'). The user may select a security threshold, e.g., 60%, for the degree of consistency in order to meet his or her personal security expectation, and this security threshold must satisfy a minimum mandatory threshold that the credit card issuer has authorized. When the consistency with the shopping habit fails to reach the expected security threshold, the related transaction is held for further authentication.

In various embodiments in the invention, both the authentication methods 500 and 600 are implemented in the secure element 102. The geo-location of the mobile device is provided by the base stations within the cellular network, and communicated to the mobile terminal 100 in real time. For the authentication method 500, the retailer location may be determined by the terminal or provided by the remote servers 108 according to the transaction request. Based on the geo-location and retailer location, the behavior pattern is analyzed, generated and updated within the secure processor 404; and stored in the secure memory 406. Authentication (steps 508 and 608) is completed in the V/A unit 408.

Both the behavior pattern based and shopping habit based authentication methods 600 are automatically implemented using embedded sensing and analysis capabilities that the mobile POS terminal 100 inherently owns. Although they demand more computation and storage resources for data analysis, these two methods are highly desirable when minimum or no user involvement is preferred. In one embodiment, the geo-location based authentication technique even allows a user to conveniently pay for coffee without any input of user name, password or biometric data, when the user regularly visits a specific coffee shop at a specific time every day.

Each trusted transaction is associated with a particular security level that the financial entity or the user desires. According to the security level, a set of default authentication rules are adopted to enable various geo-location based authentication methods for each trusted transaction. Although these default rules normally accommodate general security consideration from a perspective of hardware and software developers, the user may optionally vary the security level. For example, the user may override an authentication setting that is overly cautious for regular transactions in a particular store, e.g., the coffee shop in the user's neighborhood. Simple behavior pattern authentication is used to verify the time and geo-location for coffee ordering, while no detailed shopping habits are analyzed at all. However, a minimum allowable security level has to be guaranteed for trusted transactions at various locations, and most probably, such a requirement is determined by the payment agency 180 and the retailer 170 together based on their negotiated insurance rates or card processing fees.

One of those skilled in the art will see that privacy of user information emerged as a concern associated with such a geo-location based authentication method. The confidential user information, e.g., shopping habit and behavior pattern, is preferably stored and used within the mobile POS terminal, and prohibited from being transmitted outside the terminal. Under this circumstance, even the bank and credit card companies do not have the authority to access the confidential data, and authentication has to be completed within the mobile POS terminal. In various embodiments of the invention, protection of privacy may be enforced using both software and hardware as needed.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A security system that is included in a mobile device and used to authenticate a user or a trusted transaction made via the mobile device, comprising:
   a secure memory that stores a plurality of geo-location data that are recorded and updated using a real-time location tracking function of the mobile device;
   a secure processor, coupled to the secure memory, the secure processor generating information about a behavior pattern or a shopping habit of the user based on the plurality of geo-location data, the information is stored in the secure memory and prohibited from being transmitted outside the mobile device; and
   a verification/authentication (V/A) unit, coupled to the secure memory and the secure processor, the V/A unit determining a real-time geo-location of the mobile device and accordingly verifying the trusted transaction based on the information about the behavior pattern or the shopping habit of the user.

2. The security system according to claim 1, wherein the secure element is partitioned from an existing mobile device function module in the mobile device.

3. The security system according to claim 1, wherein the secure element is a standalone component incorporated into the mobile device.

4. The security system according to claim 1, wherein the secure element is integrated in a removable memory card or a smart card in the mobile device.

5. The security system according to claim 1, wherein the secure element integrated in an existing embedded component in the mobile device.

6. The security system according to claim 1, wherein secure environments are created in the secure element to process sensitive data that comprise account numbers, monetary value, access codes, financial transactions, financial balances, right management, program algorithms, passport information, personal identity, and credit history.

7. The security system according to claim 1, wherein the plurality of geo-location data are identified with respect to a communication network selected from a cellular network, a radio broadcast network, a television broadcast network, a global positioning system (GPS) network and a Wi-Fi computer network.

8. The security system according to claim 1, wherein the shopping behavior is extracted based on a history of the user's shopping activities that are associated with geo-locations, time of shopping, credit card used, a price range, and retailer branches at a certain geo-location.

9. An authentication method based on information concerning a behavior pattern or a shopping habit of a user, comprising the steps of:
   recording a plurality of geo-location data of a mobile device using its real-time location tracking function into a secure memory of the mobile device;
   generating and updating the information concerning the behavior pattern or the shopping habit based on the plurality of geo-location data by use of a secure processor of the mobile device;
   storing the information concerning the behavior pattern or the shopping habit in the secure memory and prohibiting the information from being transmitted outside the mobile device;

receiving a request from the user to make a trusted transaction; and verifying, by use of a verification/authentication (V/A) unit of the mobile device, the trusted transaction according to the information concerning the behavior pattern or the shopping habit and a real-time geo-location that is associated with the trusted transaction.

10. The authentication method according to claim 9, wherein the behavior pattern includes a frequency and a physical range of the user's daily activity.

11. The authentication method according to claim 9, wherein the shopping behavior is extracted based on a history of the user's shopping activities that are associated with geo-locations, time of shopping, credit card used, a price range, and retailer branches at a certain geo-location.

12. The authentication method according to claim 11, wherein the trusted transaction is verified according to the shopping habit by a degree of consistency between the trusted transaction and the user's shopping habit.

13. The authentication method according to claim 9, wherein the step of verifying the trusted transaction is implemented remotely within a remote server.

14. The authentication method according to claim 9, wherein the step of verifying the trusted transaction is implemented locally within the mobile device.

15. The authentication method according to claim 9, wherein the authentication method is implemented in hardware, firmware, software or a combination thereof.

16. The authentication method according to claim 9, wherein the plurality of geo-location data are identified with respect to a communication network selected from a cellular network, a radio broadcast network, a television broadcast network, a global positioning system (GPS) network and Wi-Fi networks.

17. An authentication method based on a geo-location of a mobile device, comprising the steps of:

storing a plurality of geo-location data in a secure memory of a mobile device using a real-time location tracking function of the mobile device;

prohibiting the plurality of geo-location data from being transmitted outside the mobile device;

determining the geo-location of the mobile device using the real-time location tracking function, when a user makes a request for a trusted transaction via the mobile device;

extracting from the plurality of geo-location data, by use of a secure processor of the mobile device, a location of a retailer involved in the trusted transaction;

comparing the geo-location of the mobile device and the location of the retailer; and authenticating, by use of a verification/authentication (V/A) unit of the mobile device, the trusted transaction when these two locations are consistent.

18. The authentication method according to claim 17, wherein the step of verifying the trusted transaction is implemented remotely within a remote server.

19. The authentication method according to claim 17, wherein the step of verifying the trusted transaction is implemented locally within the mobile device.

20. The authentication method according to claim 17, wherein the authentication method is implemented in hardware, firmware, software or a combination thereof.

* * * * *